G. F. HODKINSON.
FILTER CONSTRUCTION.
APPLICATION FILED JULY 16, 1912.
1,114,763.
Patented Oct. 27, 1914.
2 SHEETS—SHEET 1.
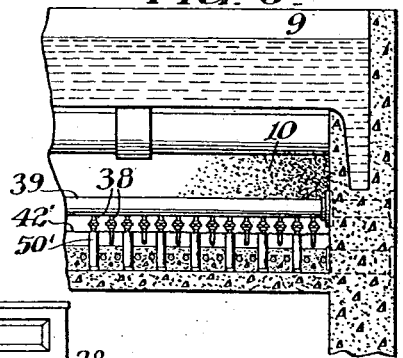
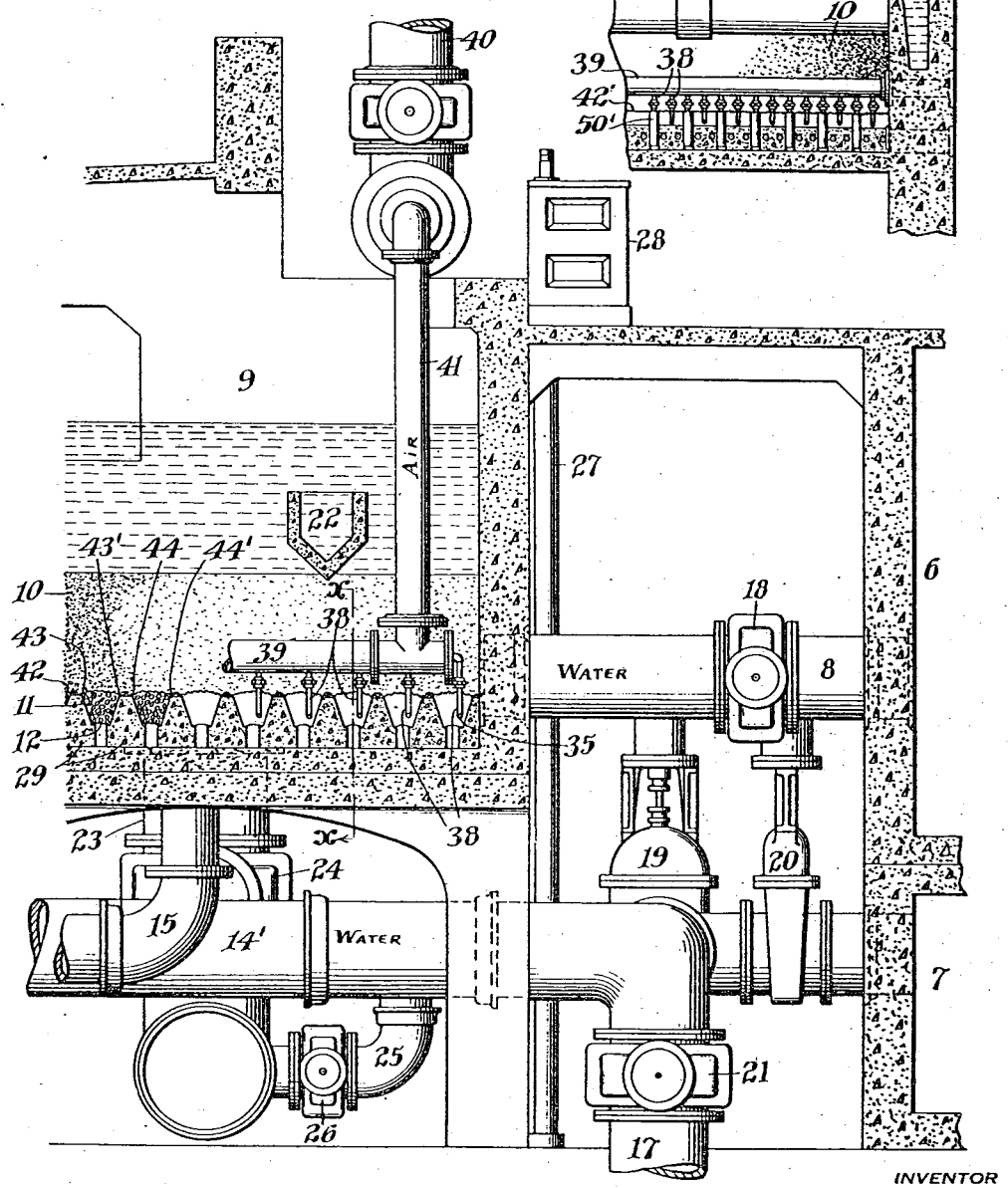
WITNESSES
INVENTOR
George F. Hodkinson
BY
ATTORNEY G. F. HODKINSON.
FILTER CONSTRUCTION.
APPLICATION FILED JULY 16, 1912.
1,114,763.
Patented Oct. 27, 1914.
2 SHEETS—SHEET 2.
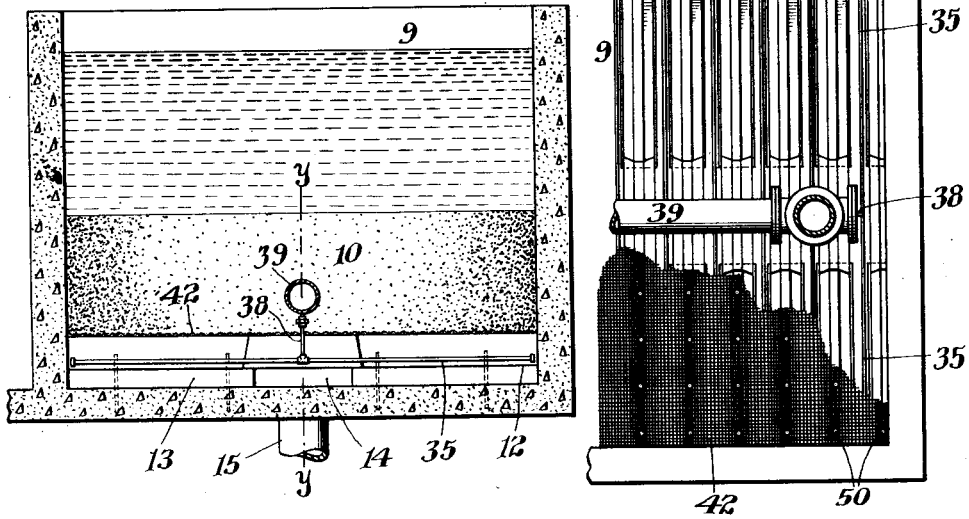
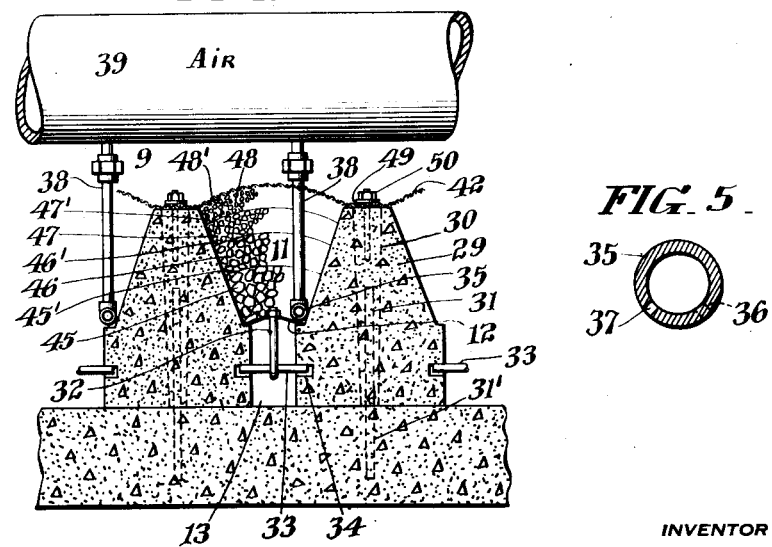

UNITED STATES PATENT OFFICE.

GEORGE F. HODKINSON, OF PHILADELPHIA, PENNSYLVANIA, ASSIGNOR OF ONE-HALF TO AMERICAN WATER SOFTENER COMPANY, OF PHILADELPHIA, PENNSYLVANIA, A CORPORATION OF NEW JERSEY.

FILTER CONSTRUCTION.

1,114,763. Specification of Letters Patent. Patented Oct. 27, 1914.

Continuation in part of application Serial No. 682,974, filed March 11, 1912. This application filed July 16, 1912. Serial No. 709,679.

*To all whom it may concern:*

Be it known that I, GEORGE F. HODKINSON, a citizen of the United States, residing at School Lane and Pulaski avenue, Philadelphia, in the county of Philadelphia and State of Pennsylvania, have invented a certain new and useful Filter Construction, of which the following is a specification.

The purpose of my invention is agitation, aeration and cleansing of gravel-filled filter conduits covered with sand, and protection of the gravel against displacement by the currents of air and water used.

A further purpose of my invention is to separate gravel or other filter bed material from the filtering material by a screen and introduce air and water under pressure beneath this screen.

A further purpose of my invention is to maintain gravel in position in a filter and prevent sand from filling up the interstices between, where air and water are to be introduced beneath the gravel layer for agitation and cleaning purposes.

A further purpose of my invention is to protect air inlet openings within the gravel bed or channel of an open gravity filter by placing the gravel in layers of different sizes with the smaller sizes on top, and to maintain this arrangement, notwithstanding the agitation, by confining the gravel. Where the gravel is placed in channels I place the gravel and maintain it preferably in truncated sector section, by a screen, and thus improve the distribution of the air and water within the gravel and sand during the washing operation.

Further purposes will appear from the specification and the claims appended thereto.

I have preferred to illustrate my invention by forms thereof which I have found to be practical, efficient and relatively inexpensive, and which well illustrate the principles involved.

Figure 1 is a transverse section across the gravel channels showing a part of an open gravity filter to which my invention is applied. Fig. 2 is a partial section of the structure of Fig. 1 taken upon line x—x thereof. Fig. 3 is a top plan view of a portion of the structure shown in Figs. 1 and 2 after the sand and gravel have been removed. Fig. 4 is an enlarged broken section of the structure shown in Fig. 2 upon line y—y thereof. Fig. 5 is a transverse section of an air distributing pipe used by me. Fig. 6 is a transverse broken section of another form of filter bed to which my invention is applied.

Similar numerals of reference indicate like parts in the drawings.

This application is intended to take the place of my application for filter construction filed March 11, 1912, Serial No. 682,974.

I have illustrated the preferred form of my invention in connection with an open gravity filter having raw water supply flume 6, filtered water channel 7, inlet water connection 8 and filter tank 9, showing concrete walls throughout.

The water normally filters down through the sand bed 10 into the gravel channels 11, thence through the perforated plates 12 into the water laterals 13. It is then drawn off by means of the manifold 14 and main collector pipe 14' connected with the piping 15, 16 and 17 in the usual way. I have illustrated suitable valves, as 18, 19, 20 and 21, at convenient points. Washing is effected by reversal of direction of water passage, forcing it through the pipes 14', 15 and the manifold 14 into the water laterals, thence through the gravel and sand, in this order, and withdrawing the wash water through wash troughs 22 and a wash flume into a waste pipe 23 protected by valve 24. I show a re-wash connection between the pipe 14' and the lower part of the waste pipe at 25, with valve 26 therein. The float tube for loss of head gage is shown at 27, leading to the control table 28.

The detail structure of the particular form of filter bottom in connection with which I have preferred to illustrate my invention is best seen in Fig. 4. The concrete walls 29 are provided with tapered openings 30, at intervals, within which pins 31 lie. These pins are surrounded with cement and extend into the lower bed of concrete at 31'. The perforated plates 12 are retained by U or hook bolts 32, passing about cross bars 33 which fit into any suitable recesses 34. This structure also is well known.

At the time of washing it is desirable to use as little water as possible, using it to liquefy the sand and rinse it but agitating by air, which performs a function of aeration also. The desirability of placing the air laterals so as to discharge below the gravel has been recognized but with so little success in overcoming the difficulties that some filters have to be entirely cleaned out at short intervals and others apply air but above the gravel.

I introduce the air by means of laterals 35 which extend longitudinally near the bottoms of the gravel chambers or channels 11 and are apertured at 36, 37, preferably in staggered relation alternating along the length of the pipe, and beneath and at the side of the ducts, the openings being best seen in Fig. 5.

At the time that the air is first turned on in such a system as I have illustrated, the air pipes are filled with water. The water is forced ahead of the air out of the vertical pipes and laterals and, last, out of the pipes 35 through the openings 36 and 37, which are placed in the bottom of the pipe for two reasons: The water naturally settles in the bottom of the pipe and the continued air pressure is thus enabled to force all of the water out; and the expulsion of the air in divergent directions downwardly, greatly assists in the distribution of the air and agitation by it.

The gravel is preferably arranged in layers of different sizes, fine above and coarse below, and, where the gravel lies within channel, I prefer to form the tops of successive layers higher in the center than at the edges, as best seen in Fig. 4, for purposes hereafter shown.

The water supplied to bring the sand to fluidity and to rinse it is not required in sufficient volume and pressure to tend to greatly disturb the gravel. But when in addition the air is supplied in sufficient volume and at a pressure deliberately designed to agitate the sand, but for my invention the combined flows disturb the protecting layer of gravel above the air openings and allow sand to mix with the gravel in a way which would not occur if the comparatively close assemblage of the successive layers of graded gravel had not been disturbed.

The air pressure is supplied to the laterals by the vertical feeders 38 from manifold 39, connected with the main air supply pipe 40 by vertical connection 41. I aim to protect the gravel from disturbance by the combined water and air flow and to combine this protection with a desirable arrangement of the gravel to obtain the most effective distribution of the air throughout the body of the gravel and sand. For these purposes I use the screen 42, preferably of wire cloth and preferably in the form and having the relation to the other parts hereinafter described. The screen is shown as covering a gravel channel in Figs. 1–4 and as covering a gravel bed in Fig. 6.

The use of a cover screen over a gravel channel is not broadly new to me, but I believe the use of air under such a cover is new and especially when fitting against, or nearly against the gravel in a full, or approximately full gravel channel, and that I am the first to bow the screen and the bed of gravel over an air inlet so as to obtain approximate equality of gravel resistance to the flow of the mixed air and water, in order that they be diverted from a direct upward course and distributed in substantially the same lines from each channel within a channel section, agitating at the same time and over nearly the same area, as that rendered fluid by the water. I have indicated possible limits for the channel form illustrated, approximately represented by the continuation of the side planes of each of the gravel channels, as seen in Fig. 1 at lines 43, 44, and 43′, 44. The exact extent of the diversion of the lines of flow of the water and air will depend upon the pressures of each, the conditions and depths of the gravel and sand, the shapes of the sides of the gravel channels, and, for the air, the depth at which the air is introduced and the number, size and spacing of the air openings, etc.

The openings in plate 12 are preferably smaller than in the screen 42 and they are also not quite as close together. Viewed as screens, that appearing in the arched plate at 12 and held against the cement walls by bolt 32 is relatively finer than the screen 42. For this reason, as well as because of the greater area of the screen 42 due to its location at a wider part of the channel, the screen 42, particularly in the form shown in Figs. 1–4, offers much less resistance to passage of fluid than the screen 12. If the screen 42 did not allow the water and air to pass through it with sufficient freedom, the water forced through the screen 12 during the washing operation would tend to lift the screen 42 bodily and this action would be increased by the pressure of the air admitted between the screens.

The sum of the areas of the holes in screen 12 must, of course, be less than the cross sectional area of the wash water supply. The filling of the gravel channels practically into contact, preferably into close contact with the wire cloth, prevents the intermingling of the different sizes of gravel and makes each size, in its place, protect the interstices of the next larger size below from improper closure, protecting the necessarily small openings of the air laterals from sand interference.

While the arrangement above, with bowed screen, is preferred for some types of filter, a part of the advantage is obtained by merely filling the gravel channels up to the top and placing the wire cloth in substantial contact with the top of the gravel, since little room is thus given for movement of the gravel, and one part of my invention contemplates the use of flat screens, instead of the bowed screens 42 whether the channel be filled up with gravel or not, in such a structure as that shown in Fig. 4 and the preferred use of flat screens 42' in other structures of which one form is shown in Fig. 6. The filling the channel above the level of its side walls, preferably in curved formation, affords much better opportunity for bringing the wire cloth down against the gravel with whatever fit thereagainst may be desired by the engineer, in view of the circumstances of the particular installation in mind and to suit his own preference. It gives, moreover, the desired curvature of the top of the gravel, which, when maintained in each of the several layers of the different sizes of the gravel, secures the best results in the thorough concurrent distribution of the water and air with cross currents of these from adjoining channels beginning at a distance shortly above the tops of the channels.

I have illustrated the several layers of gravel at 45, 46, 47, 48, having curved upper surfaces 45', 46', 47' and 48', respectively, without intending to suggest this number of sizes, curvature, nor this degree of curvature of surfaces as essential to secure a part, at least, of the benefit of my invention. I have secured the wire cloth to the tops of the concrete walls as at 49, by any suitable bolts or other means 50, so as to conform it to the shape of the top of the gravel.

In the form shown in Fig. 6, I have applied my invention to a filter in which the gravel lies in extended beds, rather than in channels, and in which the screen cover 42' for restraint of gravel movement is held in place by posts 50', located at intervals, and to which the wire cloth is secured in any suitable way.

It will be evident that my maintenance of the protection of the gravel enables me to put the air pipes low in the bed, where the air will mingle with and be carried along by the streams of water, and where it will be further spread by the divergence of the gravel paths.

It will be further evident that the pressure of the air may be made equal over the entire system of laterals if the proportion of the aggregate cross-section of the air orifices to the cross-section of the feeding pipes be kept low.

It will be further evident that any desired system of water and air feeders or headers may be used for supplying the air and water conveniently and effectively.

Having thus described my invention, what I claim as new and desire to secure by Letters Patent is:—

1. In a device of the character stated, a gravel channel, gravel in the channel arranged in graded layers in contact with each other, the finer gravel being at the top, a screen covering the channel and in substantial contact with the gravel, sand over the gravel and screen, means for withdrawing water filtered through the sand and gravel and means for forcing water into the channel and separate means for releasing air under pressure within the gravel at a point near the bottom of the channel.

2. In a device of the character stated, a gravel channel having sides converging toward the bottom, gravel filling the channel and extending above the level of the channel walls, a screen cover for the channel, bowed to confine the gravel and to engage with the top of the channel walls, sand above the screen, means for admitting and withdrawing water to and from the bottom of the channel and means for admitting air at a point near the bottom of the channel.

3. In a filter, a channel, graded gravel filling the channel, one size of gravel resting upon another, a lateral air pipe within the channel adapted to release air within the gravel, means for supplying air under pressure to the air pipe and means for maintaining the gravel in graded position against disturbance by the air supply.

4. In a filter, a relatively fine filtering material, a coarser material below the same, a screen between the two materials and means for releasing air within the gravel and water beneath the screen.

5. In a filter, materials of different size therein, one being gravel of different sizes, arranged in layers according to the size, a screen separating the two materials and making contact with the gravel and means for releasing air within the gravel and water beneath the screen.

6. In a filter, a channel, a lateral air pipe within the channel and having openings upon its under side, means for supplying air under pressure to the air pipe, a graded filling of gravel for the channel surrounding the air pipe, a screen engaging the top of the gravel for maintaining the gravel in position against disturbance by the air supply and sand above the screen.

7. In a filter, a channel, a lateral air pipe within the channel having openings extending in diverging directions from the under side of the pipe, means for supplying air pressure to the air pipe, a filling of gravel for the channel of different sizes and arranged in contacting layers with the larger sizes beneath the smaller sizes, covering the air pipe and terminating at the top in a convex surface, a bowed screen engaging the convex surface of the gravel for maintaining the gravel in position against disturbance by the air supply and sand above the screen.

8. In a filter, a channel, screens at the top and bottom of the channel, the lower screen being of relatively finer mesh than the upper screen, offering more resistance to fluid passage therethrough, gravel filling the space between the screens, sand above the upper screen, a lateral air pipe within the gravel apertured therein, means for supplying air under pressure to said air pipe and means for supplying water under pressure beneath the lower screen.

9. In a device of the class described, a filter bottom comprising a water channel, a screen overlying said water channel, an air duct above said screen, a second screen above said air duct, filtering material above said second screen, and relatively coarser material between said first mentioned screen and said second screen.

10. In a device of the class described, a filter bottom comprising a water channel, a fine screen above said water channel, an air duct above said screen, a relatively coarser screen above said air duct, material between said screens composed of parts too large to pass through said upper screen, and finer filtering material above said upper screen.

11. In a filter, a base or floor, a series of upwardly tapering projections on said floor, a screen extending between said projections below the tops thereof, a second screen above said first mentioned screen, filtering material above said second screen and relatively coarser material between said screens, means for discharging air under pressure into the space between said screens, and means for forcing water into the space below said first mentioned screen for the purpose of causing an upward current of air and water through said filter.

12. In a filter, a base or floor, a series of upwardly tapering projections on said floor, a screen extending between said projections below the tops thereof, a second screen extending across the tops of said projections, filtering material above said second screen and relatively coarser material between said screens, means for discharging air under pressure into the space between said screens, and means for forcing water into the space below said first mentioned screen for the purpose of causing an upward current of air and water through said filter.

13. In a filter, a base or floor, a series of upwardly tapering projections on said floor, a screen extending between said projections below the tops thereof, a second screen extending across the tops of said projections, air inlet pipes between said screens, means for introducing water under pressure beneath said first mentioned screen, filtering material above said second screen, and relatively coarser material between said screens.

14. In a filter, a base or floor having a series of parallel depressions separated by walls which taper toward their upper edges, relatively fine screens extending between said walls below their upper edges, an air inlet pipe communicating with said filter above said screens, a coarser screen above said air inlet pipe, filtering material above said coarser screen, relatively coarser material between said screens, and means for introducing water below said finer screen.

15. In a filter, a base or floor having a series of parallel depressions separated by walls which taper toward their upper edges, relatively fine screens extending between said walls below their upper edges, bolts engaging said screens and at their lower ends engaging cross members anchored in the adjoining walls, an air inlet pipe communicating with said filter above said screen, a coarser screen above said air inlet pipe, filtering material above said coarser screen, relatively coarser material between said screens, and means for introducing water below said finer screen.

16. In a filter, a base or floor having a series of parallel depressions separated by walls which taper toward their upper edges, relatively fine screens extending between said walls below their upper edges, bolts engaging said screens and anchored at their lower ends to the adjoining walls, an air inlet pipe communicating with said filter above said screen, a coarser screen above said air inlet pipe, filtering material above said coarser screen, relatively coarser material between said screens, and means for introducing water below said finer screen.

17. In a filter, a base or floor having a series of parallel depressions separated by walls which taper toward their upper edges, relatively fine screens extending between said walls, bolts engaging the central part of said screens and extending downwardly therefrom and at the lower ends engaging cross members anchored in recesses in the adjoining walls, an air inlet pipe communicating with said filter above said screen, a coarser screen above said air inlet pipe, filtering material above said coarser screen, relatively coarser material between said screens, and means for introducing water below said finer screen.

18. In a filter, a base or floor having a series of parallel depressions separated by walls which taper toward their upper edges, relatively fine screens extending between said walls, bolts engaging the central part of said screens and extending downwardly therefrom and at the lower ends engaging cross members anchored in recesses in the adjoining walls, an air inlet pipe communicating with said filter above said screen, a coarser screen above said air inlet pipe, said coarser screen being secured by bolts to the upper edges of said walls, filtering material above said coarser screen, relatively coarser material between said screens, and means for introducing water below said finer screen.

GEORGE F. HODKINSON.

Witnesses:
HELEN I. KAUFFMAN,
WM. STEELL JACKSON.